United States Patent [19]

Meier et al.

[11] Patent Number: 5,169,700
[45] Date of Patent: Dec. 8, 1992

[54] FACED FIBER GLASS INSULATION

[75] Inventors: Spencer I. Meier, Parker; Charles Lostak, Littleton, both of Colo.

[73] Assignee: Manville Corporation, Denver, Colo.

[21] Appl. No.: 659,791

[22] Filed: Feb. 22, 1991

[51] Int. Cl.[5] .................. B32B 3/02; B32B 5/26; B32B 5/28; B64D 45/00

[52] U.S. Cl. .................. 428/74; 244/121; 244/129.2; 428/192; 428/193; 428/236; 428/285; 428/286; 428/287; 428/332; 428/337; 428/920; 428/921

[58] Field of Search .............. 244/121, 129.2; 428/74, 428/192, 193, 236, 285, 286, 287, 332, 337, 920

[56] References Cited

U.S. PATENT DOCUMENTS

3,850,723 11/1974 Ackley .................. 156/180
4,310,585 1/1982 Shannon .................. 428/285
4,522,673 6/1985 Fell .................. 428/80

*Primary Examiner*—James C. Cannon
*Attorney, Agent, or Firm*—Cornelius P. Quinn

[57] ABSTRACT

An aircraft insulation product comprising a glass fiber blanket faced on at least one major face with an air permeable sheet. Insulating fibers coated with unbonded binder are directed to a web of the permeable sheet material supported on a moving collection chain, and the resulting fibrous layer and the web are sent to an oven where the binder is cured. The collection web thus becomes bonded to the blanket by the binder to become an integral part of the insulation product. A plurality of stacked blankets, the edges of which are covered by a film, may be used instead of a single faced blanket.

14 Claims, 3 Drawing Sheets

FACED FIBER GLASS INSULATION

FIELD OF THE INVENTION

This invention relates to fibrous insulation material. More particularly, it relates to a fibrous insulation product, such as a fiber glass blanket, to which a facing sheet is adhered.

BACKGROUND OF THE INVENTION

Fibrous insulation products are available in various densities for use in a variety of different environments. One such product is a lightweight glass fiber blanket used to insulate structure which requires a high degree of insulation, such as aircraft hulls. In such an environment it is important that the weight be minimal so as not to add unnecessarily to the weight of the aircraft, and that the blanket be capable of providing an effective barrier to the high sound levels and cold temperatures encountered during flight.

Typical products now in use are comprised of fine glass fibers bonded together in blanket form and having a density of about 0.3 pound per cubic foot (pcf) to 1.5 pcf. Depending on the dimensions of the space required to be insulated, either a single blanket or several stacked blankets are wrapped and secured within a film, as by sewing or heat sealing, and the wrapping insulation is then attached to the aircraft fuselage by pins connected to the skin of the aircraft. In addition to holding the wrapped insulation in place, the pins prevent the insulation blankets from shifting with respect to each other. Due to the fragile nature of the insulation, a great many pins are required to satisfactorily hold the blankets in place. For example, it is not uncommon for as many as 10,000 pins to be used to install insulation in a large aircraft. This is not only a time consuming operation, but the cost of the pins themselves is expensive. Also, because the operation compresses the insulation blanket in the area surrounding the pins, some of the insulation performance value may be sacrificed.

While such products perform their insulating function satisfactorily, certain of their other characteristics could advantageously be improved. For example, although the low density, lightweight construction of the blankets makes them quite suitable as insulators, it also results in minimal physical properties, making the products susceptible to damage. In particular, the relatively low tensile strength of the product offers little resistance to stresses encountered during fabrication and installation. This is especially so in environments where the product is placed under tension by being wrapped about a structure. Handling of the individual layers and fabrication of the multi-layered product subject the material to additional stresses which tend to damage the weak fiber glass material.

In addition, the effectiveness of insulation wrapped in a film is likely to be reduced in service by condensation of water vapor trapped within the insulation. Because the commercial product usually requires an outer film to allow the insulating blanket to be handled and installed as desired, there would appear to be no easy solution to this problem.

It can be seen from the foregoing that it would be beneficial to improve the tensile strength of a blanket of fibrous insulating material without impairing its insulating ability and without adding significantly to its cost or weight. It would also be beneficial to be able to eliminate the condensation problem without adversely affecting the product.

BRIEF SUMMARY OF THE INVENTION

In accordance with the invention, a lightweight fibrous insulation blanket having a density in the range of 0.2 to 1.5 pcf and a thickness in the range of ⅜ inch to 2 inches, is comprised of fibers bonded together by cured thermosetting binder. A facing sheet which is permeable to air is bonded to a major face of the blanket by the cured thermosetting binder. Preferably, the fibers comprise glass fibers bonded together and to the facing sheet by phenolic binder, and the facing sheet is a porous woven or nonwoven organic or inorganic scrim.

The blanket may be employed in the form of a single layer or thickness, or may be encased with other blankets in stacked relationship within a heat sealable film. Preferably, the facing sheet is capable of being heat sealed to the film.

The facing improves the tensile strength of the insulation product and increases its stiffness. Further, the facing sheet is highly permeable so that it allows the free passage of air in and out of the blanket. This in turn allows the evaporation of any moisture from installed insulation, such as would be encountered in an aircraft installation, when the insulation is installed with the facing material facing the passenger side of the aircraft.

To adhere facing material to a face of lightweight, low density fibrous insulation would normally require a separate laminating operation, which would not only add to the manufacturing cost of the product but could also impair the structure of the insulating material if excessive pressure has to be applied in order to adhere the material to the insulation. Also, the adhesives employed in a separate laminating operation may add too much additional weight to the product and may further be of concern regarding fire resistance of the product. Instead of the facing being applied in a separate laminating operation, the porous nature of the facing permits it to be applied to the fibrous insulation by moving a sheet or web of air permeable facing material in a predetermined direction and at the same time directing fibers entrained in a moving stream of air against a major face of the moving permeable sheet. By creating a pressure differential between opposite major faces of the moving permeable sheet, the air passes through the sheet to the area of negative pressure while the fibers are collected on the sheet and built up to form a layer. The permeable sheet is permanently adhered to the fibrous layer as facing material to become an integral part of the product. By supporting the permeable sheet on the metal collection chain normally employed to collect the fibers, and passing the sheet and the layer of fibers through a curing oven, a thin, flexible sheet can be employed as the facing material and can be adhered to the fibrous layer without the necessity of a separate laminating step.

These and other features and aspects of the invention, as well as their benefits, will be made more clear in the following detailed description of the preferred embodiments.

DETAILED DESCRIPTION OF THE PREFERRED EMBODIMENTS

Figures 1, 8:
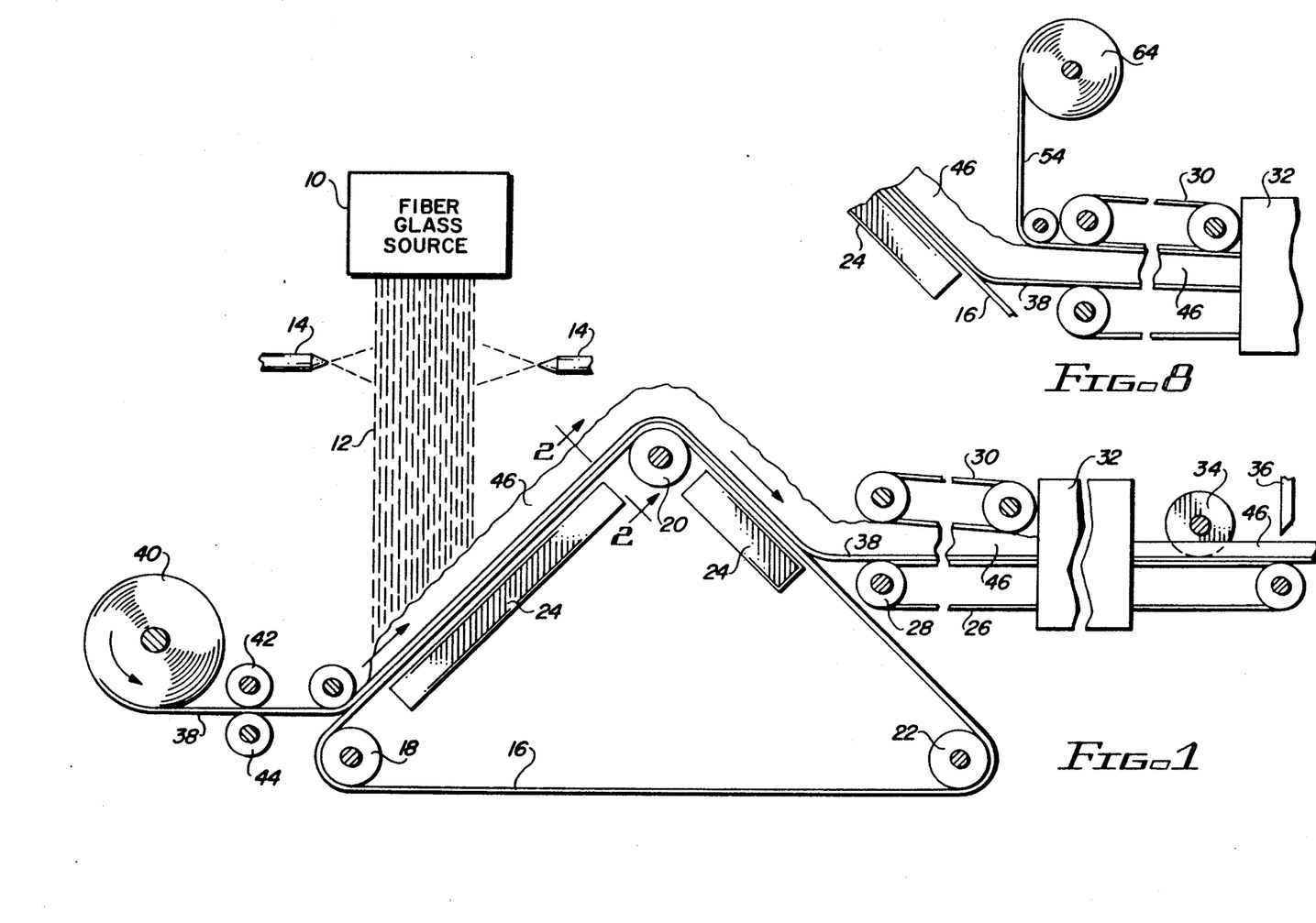
FIG. 1 is a schematic representation of the method employed to produce the faced insulation blanket of the present invention.
FIG. 8 is a partial schematic representation of a modified portion of the apparatus of FIG. 1, showing the introduction of a top web to the insulation product.

Referring to FIG. 1, which illustrates the preferred method of manufacturing the faced blanket of the invention, a source 10 supplies glass fibers 12, which are sprayed with binder by nozzles 14 as the fibers travel toward a moving screen 16. The source may be of any desired type, such as a rotary spinner, into which molten glass is introduced and which upon rapidly rotating causes the molten glass to exit through small holes in the side walls, resulting in the formation of fibers. A so-called "pot and marble" operation could also be used, wherein marbles or pellets of glass are melted in a pot, with the molten glass being drawn from the pot through bushings in the form of fibers.

Whether one of these processes or a different process entirely is the source of the fibers, a fiber glass blanket is normally produced by directing a stream of air-entrained fibers against the moving screen 16. The moving screen, which is known in the art as a collection chain, is typically an open-weave endless metallic conveyor trained about rollers 18, 20 and 22. Suction is created within the path of the collection chain by any suitable means, as by the suction boxes 24 mounted directly beneath the collection chain in the upward and downward runs between the roller 20 and the rollers 18 and 22. The vacuum or negative pressure in the collection chamber in which the collection chain runs causes the air stream carrying the fibers to pass through the collection chain. Because the openings in the chain are small enough to filter out most of the fibers contacting it, the fibers so filtered are deposited on the chain and are able to support the fibers which are deposited on them. In so doing, a fiber glass layer of predetermined weight or thickness is built up. It will be understood that the rate of fiber production, the type of fibers produced and the speed of the collection chain are all correlated to provide control over the thickness of the layer.

The manufacturing process typically includes an endless conveyor 26 trained about a roller 28 located near the collection chain 16. The fibrous web is transferred from the collection chain to the conveyor 26 and may be further contacted on its upper surface by an upper conveyor 30 arranged so that the space between conveyors 30 and 26 just prior to entering oven 32 corresponds to the desired final thickness of the blanket. The blanket may also be compressed by conveyors or rollers inside the oven, not shown, to the final desired thickness. The heat in the oven cures the binder on the fibers, and the cured binder holds the fibers in place. The finished product may be trimmed or slit into smaller widths by one or more slitters 34 and may be cut to length by knife 36, after which the cut lengths can be packaged or attached to other lengths to form a thick laminated blanket.

In accordance with the preferred method of producing the product of the invention, a web of permeable material 38 is drawn from a roll 40 by rollers 42 and 44 and is directed to the upward run of the collection chain 16. The pressure differential existing on opposite sides of the collection chain causes the web 38 to contact and be supported by the collection chain. Because the material 38 is highly permeable, the air stream carrying the fibers is able to pass through the web, depositing the fibers directly onto the web. The web thus in effect functions as the outer surface of the collection chain, moving in unison with it.

Figure 2:
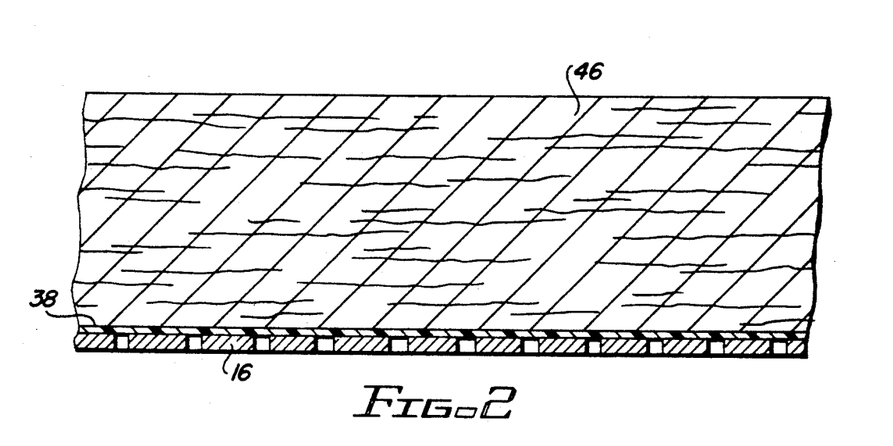
FIG. 2 is an enlarged transverse sectional view taken on line 2—2 of FIG. 1.

As shown in FIGS. 1 and 2, the fibers have built up on the outer surface of the web 38 to form a layer or blanket 46 while the web is supported by the collection chain 16. When the fibrous layer is stripped from the collection chain in transferring to the conveyor 26, the web of permeable material is stripped off along with it, so that the fibrous layer 46 and the web 38 are fed as a unit to the oven 32. There, the curing of the binder results not only in the fibers being bonded to one another, but in the fibers being bonded to the web 38 as well.

Figure 3:
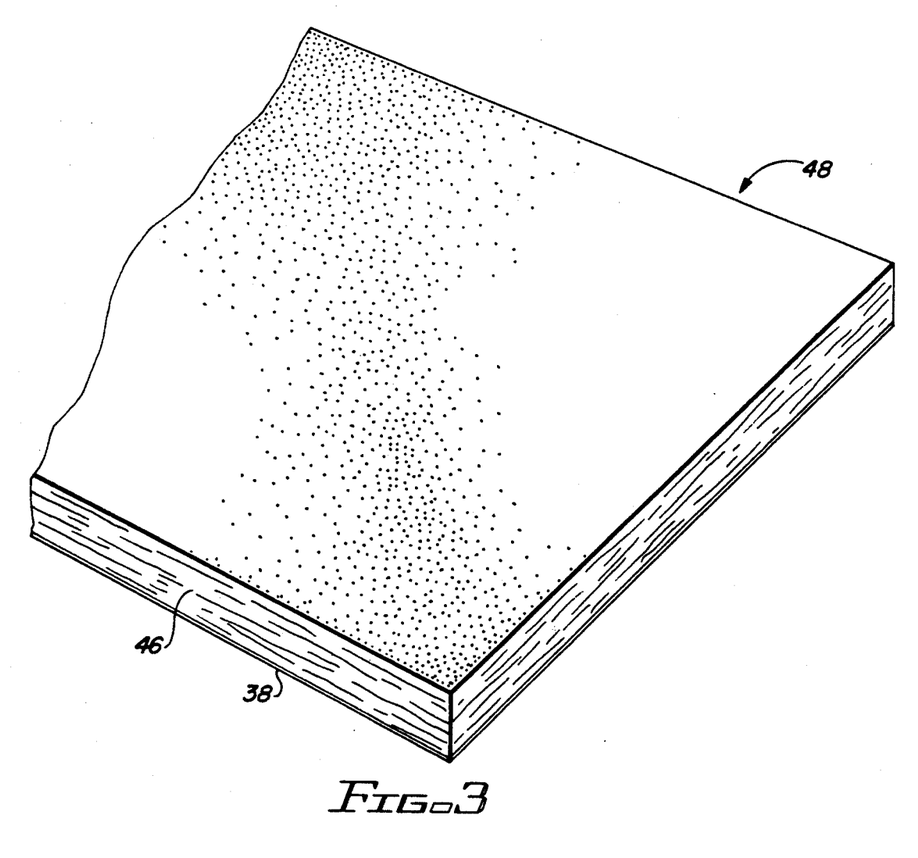
FIG. 3 is a partial pictorial view of the insulating product of the invention.
Figure 4:
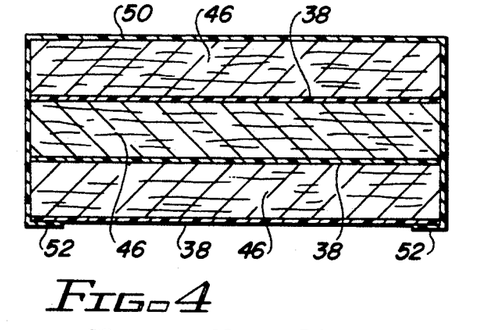
FIG. 4 is a transverse sectional view of an insulation product comprised of a plurality of blankets in stacked relationship adhered to a film.

As shown in FIG. 3, the resulting product 48 is a compressed layer 46 of bonded fibers and a sheet 38 of permeable material bonded to a major face of the layer. Although the faced blanket can be used in this condition, it is more likely to be installed in multiple layers as previously discussed. Such an arrangement is illustrated in FIG. 4, wherein three faced blankets 46 are aligned in stacked face-to-face relationship within a wrapper or sleeve of film 50. The ends of the film terminate at the edge portions of the outer facing sheet 38 as indicated at 52, where they are attached to the faced blanket 48 as by stitching, not shown, or by heat seal, which is the preferred manner of attachment.

Figure 5:
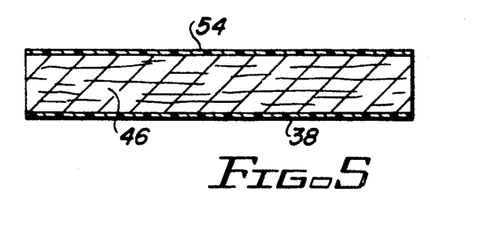
FIG. 5 is a transverse sectional view of another embodiment of the invention.
Figure 6:
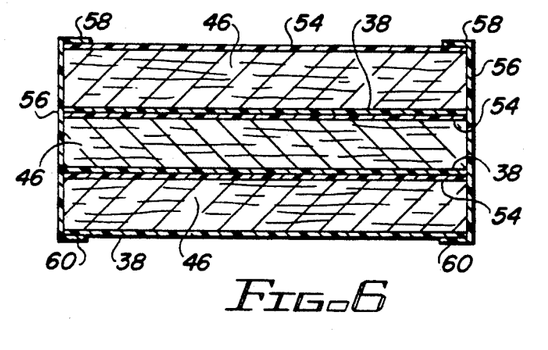
FIG. 6 is a transverse view similar to that of FIG. 4, but showing stacked blankets comprised of double-faced blankets.

If desired, both faces of the blanket may be provided with a facing sheet. This design is illustrated in FIG. 5, where both major faces of the blanket 46 are provided with similar porous facing sheets 38 and 54, which provides additional strength and stiffness to the product and also enables the user to install either side of the product facing the passenger side. A double-faced blanket may be used in a multiple layered arrangement, such as shown in FIG. 6, where the film 56 is shown as being attached to both of the facing sheets 38 and 54 at the overlapped portions 58 and 60, as by stitching or heat sealing.

Figure 7:
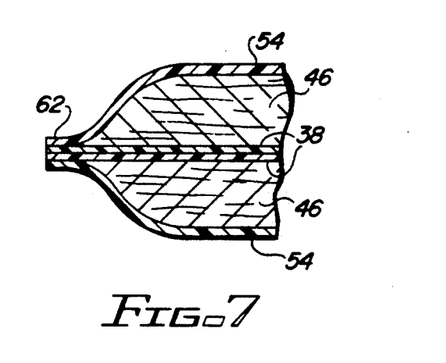
FIG. 7 is a transverse sectional view of another embodiment of a product comprised of double-faced blankets.

Another form of product comprised of double-faced blankets is illustrated in FIG. 7, wherein the facing sheets 54 and 38 extend out beyond the fiber glass material and are attached to each other, as by heat sealing or stitching, to form a bonded flange 62 comprised of the overlapping sheets. The resulting pillow-shaped product is simpler to fabricate than the product of FIG. 6. It will be understood that such an arrangement is not limited to two layers as illustrated.

As shown in FIG. 8, to provide a second facing sheet on the insulation blanket a web of facing material 54 is introduced from a roll 64 to the upper face of the insulation layer 46 just prior to the layer passing beneath the conveyor 30, so that the facing material 54 is in place when the insulation layer enters the oven 32. The curing of the binder in the insulation layer will then bond the facing material to the upper face of the layer.

Figure 9:
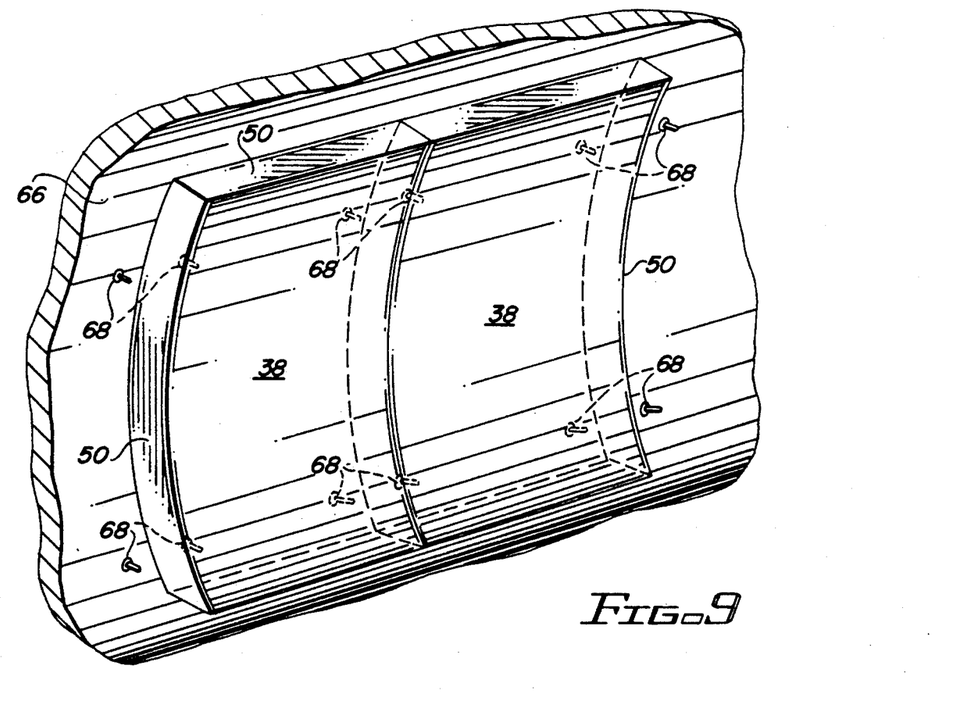
FIG. 9 is a partial pictorial view of the faced blanket of the invention encased in an outer film and attached to the skin of an aircraft fuselage.

A typical installation of the product in an aircraft is shown in FIG. 9, wherein a number of faced blankets have been encased in a film 50 which is heat sealed to the edge portions of the facing sheet 38, leaving the major portion of the sheet exposed. The film-encased insulation is attached to the aircraft structure 66 by means of pins 68 which penetrate the blankets and are secured to the structure by any suitable means, such as by welding, clamps or bolts.

Although the facing material has to be sufficiently permeable so as not to impede the flow of air through the collection chain during the manufacturing process or through the facing sheet of the installed faced insulating blanket product, it should also be capable of adding to the tensile strength of the final product and should have sufficient strength to remain intact during the fiber collection process. A sheet capable of functioning in the manner described should be porous, strong, tear resistant and lightweight, for example, less than 1.5 ounces per square yard. Generally, it can be any porous woven or nonwoven scrim or reinforcement media, composed of organic or inorganic fibers with a flame retardant system meeting the flammability requirements of 49 CFR part 25 (FAR 25.853) or BMS 8-142. The air permeability of the facing sheet should be such that at least 1000 cubic feet of air can pass through, as measured in accordance with the Frazer Air Permeability Test (ASTM D 737-1982). In addition, the facing sheet material should be heat sealable to itself and to the film which may be used to encase the insulation prior to installation. An example of such a material is polyester scrim available from Snow Filtration Company and sold under the name Reemay.

The film material may comprise any of the conventional films currently used in the installation of insulation blankets in aircraft. One example is a film comprised of Orcon, available from Orcon Corporation. The film employed should also be of a heat sealable nature.

The faced blanket should possess certain minimum properties in order to meet the requirements of performance and the rigors of installation. The tensile strength of a single-faced blanket should be at least three times that of the insulation blanket alone and the impact resistance of the product, as measured by the Mullen Burst test, should be at least 12 psi.

Although the invention has been described mainly in connection with a facing sheet applied to fiber glass insulation comprised of fine glass fibers, it will be understood that the concept is applicable to other fibers as well. Also, while the type of facing sheet may vary in accordance with the desired end product, it will also be understood that sheets comprised of a variety of different materials and different physical configurations can be used. In order to prevent fire damage to the final installation, it is preferred that the material be fire resistant.

The invention results in a number of advantages over currently available products. In addition to the improved installation performance and the ability to allow condensed moisture to escape through the porous facing sheet, the method of collecting the insulating fibers on the porous facing sheet itself may result in reducing the amount of fibers and binder that are normally lost due to passing through the open weave of the collection chain.

It should now be clear that the invention provides a simple but unique solution to the problems enumerated above in connection with lightweight fibrous insulation products, and particularly in connection with low density blankets comprised of fine fibers. The resulting product is physically superior to previously produced insulation products and lends itself to superior assembly and installation procedures.

It should now be apparent that the invention need not necessarily be limited to all the specific details described in connection with the preferred embodiment, but that changes to specific features of the preferred embodiment which do not alter the overall basic function and concept of the invention may be made without departing from the spirit and scope of the invention defined in the claims.

What is claimed is:

1. An insulation product especially suited for use as aircraft insulation, comprising:
   a fibrous insulation blanket containing fibers bonded together by cured thermosetting binder;
   the density of the blanket being in the range of 0.2 pounds per cubic foot to 1.5 pounds per cubic foot, and the thickness of the blanket being in the range of ⅜ inch to 2 inches; and
   a facing sheet bonded to a major face of the blanket by the cured thermosetting binder;
   the bonded facing sheet being permeable to air.

2. The insulation product of claim 1, wherein the fibrous insulation blanket comprises glass fibers bonded together and to the facing sheet by phenolic binder.

3. The insulation product of claim 1, wherein the facing sheet is a porous woven or nonwoven scrim.

4. The insulation product of claim 3, wherein the facing sheet is comprised of polyester.

5. The insulation product of claim 1, wherein the facing sheet when unattached to the fibrous blanket is substantially impermeable to a moving stream of the fibers of the blanket.

6. The insulation product of claim 1, wherein the binder and the facing sheet are flame resistant at least to the degree of meeting the flammability requirements of 49 CFR part 25 (FAR 25.853) or BMS 8-142, and wherein the tensile strength of the faced insulation blanket is at least three times that of the blanket alone.

7. The insulation product of claim 1, including a second facing sheet adhered to the opposite major face of the blanket, the second facing sheet being similar to the first-mentioned facing sheet.

8. An insulation product especially suited for use as aircraft insulation, comprising:
   a plurality of fibrous insulation blankets aligned with each other in stacked face-to-face relationship, the blankets containing fibers bonded together by cured thermosetting binder;
   the density of the blankets being in the range of 0.2 pounds per cubic foot to 1.5 pounds per cubic foot, and the thickness of the blankets being in the range of ⅜ inch to 2 inches;
   at least an end blanket having a facing sheet bonded to the outer major face thereof by the cured thermosetting binder, the bonded facing sheet being permeable to air; and means covering the edges of the stacked blankets, said means being adhered to the outer facing sheet on said end blanket.

9. The insulation product of claim 8, wherein the means covering the edges of the stacked blankets comprises a film which also extends over the end of the stacked blankets opposite said faced end blanket.

10. The insulation product of claim 8, wherein facing sheets are adhered to the outer faces of both end blankets in the stack, and wherein the means covering the edges of the stacked blankets comprises a film attached to both said facing sheets.

11. The insulation product of claim 8, wherein facing sheets are adhered to the outer faces of both end blankets in the stack, and wherein the means covering the edges of the stacked blankets comprises edge portions of said facing sheets extending out beyond the edges of the stacked blankets and being attached to each other.

12. In an insulated aircraft fuselage, the improvement comprising:

a fibrous insulation blanket containing fibers bonded together by cured thermosetting binder;

the density of the blanket being in the range of 0.2 pounds per cubic foot to 1.5 pounds per cubic foot, and the thickness of the blanket being in the range of ⅜ inch to 2 inches;

a facing sheet bonded to a major face of the blanket by the cured thermosetting binder;

the bonded facing sheet being permeable to air; and the blanket being attached to the fuselage so that the facing sheet faces away from the fuselage toward the interior of the aircraft.

13. The aircraft insulation improvement of claim 12, including a film extending around at least the edges of the blanket, the film being attached to the facing sheet so as to leave a major portion of the facing sheet uncovered.

14. The aircraft insulation improvement of claim 12, wherein the insulation includes a plurality of fibrous insulation blankets aligned with each other in stacked face-to-face relationship.

* * * * *

REEXAMINATION CERTIFICATE (3960th)

United States Patent [19]
Meier et al.

[11] B1 5,169,700
[45] Certificate Issued Dec. 21, 1999

[54] FACED FIBER GLASS INSULATION

[75] Inventors: Spencer I. Meier, Parker; Charles Lostak, Littleton, both of Colo.

[73] Assignee: Johns Manville International, Inc., Denver, Colo.

Reexamination Request:
No. 90/005,158, Nov. 12, 1998

Reexamination Certificate for:
Patent No.: 5,169,700
Issued: Dec. 8, 1992
Appl. No.: 07/659,791
Filed: Feb. 22, 1991

[51] Int. Cl.$^6$ .............................. B32B 3/02; B32B 5/26; B32B 5/28; B64D 45/00
[52] U.S. Cl. .................. 428/74; 244/121; 244/129.2; 428/192; 428/193; 428/332; 428/337; 428/920; 428/921; 442/50; 442/55
[58] Field of Search .............................. 428/74, 192, 193, 428/332, 337, 920, 921; 244/121, 129.2; 442/50, 55

[56] References Cited

PUBLICATIONS

"High to Medium Efficiency Filters And General Purpose Grades—Air Filter Media," No. AMF–6, dated Mar. 1985, (Mar. 1985), publication of Johns Manville Corporation.

"Micro–Fiber® Felts," No. HPI–21, dated Jun. 1990, (Jun. 1990), publication of Johns Manville Corporation.

*Primary Examiner*—Blaine R. Copenheaver

[57] ABSTRACT

An aircraft insulation product comprising a glass fiber blanket faced on at least one major face with an air permeable sheet. Insulating fibers coated with unbonded binder are directed to a web of the permeable sheet material supported on a moving collection chain, and the resulting fibrous layer and the web are sent to an oven where the binder is cured. The collection web thus becomes bonded to the blanket by the binder to become an integral part of the insulation product. A plurality of stacked blankets, the edges of which are covered by a film, may be used instead of a single faced blanket.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 8 and 12 are determined to be patentable as amended.

Claims 2–7, 9–11, 13 and 14, dependent on an amended claim, are determined to be patentable.

New claims 15–62 are added and determined to be patentable.

1. An *aircraft* insulation product [especially suited for use as aircraft insulation], comprising:
    a fibrous insulation blanket containing fibers bonded together by a *a* cured thermosetting binder;
    the density of the blanket being used in the range of 0.2 pounds per cubic foot to [1.5] *less than 0.43* pounds per cubic foot, and the thickness of the blanket being in the range of ⅜ inch to 2 inches; and
    a facing sheet bonded to a major face of the blanket by the cured thermosetting binder;
    the bonded facing sheet being permeable to air.

8. An *aircraft* insulation product [especially suited for use as aircraft insulation], comprising:
    a plurality of fibrous insulation blankets aligned with each other in stacked face-to-face relationship, the blankets containing fibers bonded together by *a* cured thermosetting binder;
    the density of the blankets being in the range of 0.2 pounds per cubic foot to [1.5] *less than 0.43* pounds per cubic foot, and the thickness of the blankets being in the range of ⅜ inch to 2 inches;
    at least an end blanket having a facing sheet bonded to the outer major face thereof by the cured thermosetting binder, the bonded facing sheet being permeable to air; and
    means covering the edges of the stacked blankets, said means being adhered to the outer facing sheet on said end blanket.

12. In an insulated aircraft fuselage, the improvement comprising:
    a fibrous insulation blanket containing fibers bonded together by *a* cured thermosetting binder;
    the density of the blanket being in the range of 0.2 pounds per cubic foot to 1.5 pounds per cubic foot, and the thickness of the blanket being in the range of ⅜ inch to 2 inches;
    a facing sheet bonded to a major face of the blanket by the cured thermosetting binder;
    the bonded facing sheet being permeable to air; and
    the blanket being attached to the fuselage so that the facing sheet faces away from the fuselage toward the interior of the aircraft.

15. *The insulation product of claim 1, wherein the blanket and the facing sheet are coupled to an aircraft fuselage.*

16. *The insulation product of claim 1, wherein the insulation product further comprises a flame retardant in the binder.*

17. *The insulation product of claim 1, wherein the insulation product further comprises a flame retardant on the facing sheet.*

18. *The insulation product of claim 1, further comprising a film at least partially covering the blanket.*

19. *An insulation product especially suited for use as aircraft insulation, comprising:*
    *a fibrous insulation blanket containing fibers bonded together by a cured thermosetting binder;*
    *the density of the blanket being used in the range of 0.2 pounds per cubic foot to 1.5 pounds per cubic foot, and the thickness of the blanket being in the range of ⅜ inch to 2 inches; and*
    *an organic facing sheet bonded to a major face of the blanket by the cured thermosetting binder;*
    *the bonded facing sheet being permeable to air;*
    *wherein the binder and the facing sheet are flame resistant at least to the degree of meeting the flammability requirements of 49 CFR part 25 (FAR 25.853) or BMS 8–142.*

20. *The insulation product of claim 19, wherein the fibrous insulation blanket comprises glass fibers bonded together and to the facing sheet by a phenolic binder.*

21. *The insulation product of claim 19, wherein the facing sheet is a porous woven or nonwoven scrim.*

22. *The insulation product of claim 21, wherein the facing sheet comprises polyester.*

23. *The insulation product of claim 19, further comprising at least one additional fibrous insulation blanket.*

24. *The insulation product of claim 19, wherein the blanket and the facing sheet are coupled to an aircraft fuselage.*

25. *The insulation product of claim 19, further comprising a film at least partially covering the blanket.*

26. *An insulation product especially suited for use as aircraft insulation, comprising:*
    *a fibrous insulation blanket containing fibers bonded together by a cured thermosetting binder;*
    *the density of the blanket being used in the range of 0.2 pounds per cubic foot to 1.5 pounds per cubic foot, and the thickness of the blanket being in the range of ⅜ inch to 2 inches;*
    *an organic facing sheet bonded to a major face of the blanket by the cured thermosetting binder;*
    *the bonded facing sheet being permeable to air; and*
    *a flame retardant system used in connection with at least some of the organic fibers of the facing sheet, wherein the flame retardant system meets the flammability requirements of 49 CFR part 25 (FAR 25.853) or BMS 8–142.*

27. *The insulation product of claim 26, wherein the fibrous insulation blanket comprises glass fibers bonded together and to the facing sheet by a phenolic binder.*

28. *The insulation product of claim 26, wherein the facing sheet is a porous woven scrim.*

29. *The insulation product of claim 26, wherein the facing sheet is a porous nonwoven scrim.*

30. *The insulation product of claim 29, wherein the facing sheet comprises polyester.*

31. *The insulation product of claim 26, wherein the facing sheet when unattached to the fibrous blanket is substantially impermeable to a moving stream of the fibers of the blanket.*

32. The insulation product of claim 26, wherein the blanket and the facing sheet are coupled to an aircraft fuselage.

33. The insulation product of claim 26, further comprising a film at least partially covering the blanket.

34. The insulation product of claim 26, further comprising at least one additional fibrous insulation blanket.

35. In an insulated aircraft fuselage, the improvement comprising:
an aircraft fuselage;
a fibrous insulation blanket containing fibers bonded together by a cured thermosetting binder;
the density of the blanket being in the range of 0.2 pounds per cubic foot to less than 0.43 pounds per cubic foot, and the thickness of the blanket being in the range of 3/8 inch to 2 inches;
a facing sheet bonded to a major face of the blanket by the cured thermosetting binder;
the bonded facing sheet being permeable to air; and
the blanket being attached to the fuselage so that the facing sheet faces away from the fuselage toward the interior of the aircraft.

36. The aircraft insulation improvement of claim 35, wherein the fibrous insulation blanket comprises glass fibers bonded together and to the facing sheet by a phenolic binder.

37. The aircraft insulation improvement of claim 35, wherein the facing sheet is a porous woven or nonwoven scrim.

38. The aircraft insulation improvement of claim 37, wherein the facing sheet comprises polyester.

39. The aircraft insulation improvement of claim 37, wherein the facing sheet is a woven fiberglass scrim.

40. The aircraft insulation improvement of claim 35, wherein the facing sheet when unattached to the fibrous blanket is substantially impermeable to a moving stream of the fibers of the blanket.

41. The aircraft insulation improvement of claim 35, wherein the binder and the facing sheet are flame resistant at least to the degree of meeting the flammability requirements of 49 CFR part 25 (FAR 25.853) or BMS 8–142, and wherein the tensile strength of the faced insulation blanket is at least three times that of the blanket alone.

42. The aircraft insulation improvement of claim 35, wherein the insulation includes a plurality of fibrous insulation blankets aligned with each other in stacked face-to-face relationship.

43. The aircraft insulation improvement of claim 35, further comprising an organic facing sheet having a flame retardant.

44. The aircraft insulation improvement of claim 35, further comprising a film at least partially covering the blanket.

45. In an insulated aircraft fuselage, the improvement comprising:
a fibrous insulation blanket containing fibers bonded together by a cured thermosetting binder;
the density of the blanket being in the range of 0.2 pounds per cubic foot to less than 0.43 pounds per cubic foot, and the thickness of the blanket being in the range of 3/8 inch to 2 inches;
a facing sheet bonded to a major face of the blanket by the cured thermosetting binder;
the bonded facing sheet being permeable to air; and
the blanket being attached to the fuselage so that the facing sheet faces away from the fuselage toward the interior of the aircraft.

46. The aircraft insulation improvement of claim 45, wherein the fibrous insulation blanket comprises glass fibers bonded together and to the facing sheet by a phenolic binder.

47. The aircraft insulation improvement of claim 45, wherein the facing sheet is a porous woven or nonwoven scrim.

48. The aircraft insulation improvement of claim 45, wherein the facing sheet comprises polyester.

49. The aircraft insulation improvement of claim 45, wherein the facing sheet when unattached to the fibrous blanket is substantially impermeable to a moving stream of the fibers of the blanket.

50. The aircraft insulation improvement of claim 45, wherein the binder and facing sheet are flame resistant at least to the degree of meeting the flammability requirements of 49 CFT part 25 (FAR 25.853) or BMS 8–142, and wherein the tensile strength of the faced insulation blanket is at least three times that of the blanket alone.

51. The aircraft insulation improvement of claim 45, wherein the insulation includes a plurality of fibrous insulation blankets aligned with each other in stacked face-to-face relationship.

52. The aircraft insulation improvement of claim 45, further comprising an organic facing sheet having a flame retardant.

53. The aircraft insulation improvement of claim 45, further comprising a film at least partially covering the blanket.

54. In an insulated aircraft fuselage, the improvement comprising:
a fibrous insulation blanket containing fibers bonded together by a cured thermosetting binder;
the density of the blanket being in the range of 0.2 pounds per cubic foot to 1.5 pounds per cubic foot, and the thickness of the blanket being in the range of 3/8 inch to 2 inches;
a facing sheet bonded to a major face of the blanket by the cured thermosetting binder;
the bonded facing sheet being permeable to air;
the blanket being attached to the fuselage so that the facing sheet faces away from the fuselage toward the interior of the aircraft; and
wherein the binder and facing sheet are flame resistant at least to the degree of meeting the flammability requirements of 49 CFR part 25 (FAR 25.853) or BMS 8–142.

55. The aircraft insulation improvement of claim 54, wherein the fibrous insulation blanket comprises glass fibers bonded together and to the facing sheet by a phenolic binder.

56. The aircraft insulation improvement of claim 54, wherein the facing sheet is a porous woven or nonwoven scrim.

57. The aircraft insulation improvement of claim 56, wherein the facing sheet comprises polyester.

58. The aircraft insulation improvement of claim 54, wherein the facing sheet when unattached to the fibrous blanket is substantially impermeable to a moving stream of the fibers of the blanket.

59. The aircraft insulation improvement of claim 54, wherein the insulation includes a plurality of fibrous insulation blankets aligned with each other in stacked face-to-face relationship.

60. The aircraft insulation improvement of claim 54, further comprising an organic facing sheet having a flame retardant.

61. The aircraft insulation improvement of claim 54, further comprising a film at least partially covering the blanket.

62. An aircraft insulation product, comprising:

a fibrous insulation blanket containing fibers bonded together by a cured thermosetting binder;

the density of the blanket being used in the range of 0.2 pounds per cubic foot to less than 0.43 pounds per cubic foot, and the thickness of the blanket being in the range of 3/8 inch to 2 inches;

a facing sheet bonded to a major face of the blanket by the cured thermosetting binder;

the bonded facing sheet being permeable to air; and at least a second insulation blanket containing fibers, wherein the second blanket is aligned with the first blanket in a stacked face-to-face relationship.

* * * * *